United States Patent [19]

Kumar et al.

[11] Patent Number: 5,586,154

[45] Date of Patent: *Dec. 17, 1996

[54] SELF-ALIGNING SEAL SYSTEM FOR MAINTENANCE SERVICE IN NUCLEAR REACTOR PRESSURE VESSELS

[75] Inventors: Kirti Kumar; Karl B. Larsen, both of San Jose, Calif.

[73] Assignee: General Electric Company, San Jose, Calif.

[ * ] Notice: The term of this patent shall not extend beyond the expiration date of Pat. No. 5,426,675.

[21] Appl. No.: 371,736

[22] Filed: Jan. 12, 1995

Related U.S. Application Data

[63] Continuation-in-part of Ser. No. 786,460, Nov. 1, 1991, Pat. No. 5,426,675.

[51] Int. Cl.⁶ .................................................. G21C 13/00
[52] U.S. Cl. ............................ 376/203; 376/204; 251/319
[58] Field of Search ...................................... 376/203, 204, 376/361, 370, 372; 220/353, 358; 138/31; 251/318, 319; 137/533.19, 543.19

[56] References Cited

U.S. PATENT DOCUMENTS

| | | | |
|---|---|---|---|
| 1,988,044 | 1/1935 | Moran | 220/358 |
| 5,070,589 | 12/1991 | Howell et al. | 376/260 |
| 5,078,954 | 1/1992 | Smith et al. | 376/260 |
| 5,102,612 | 4/1992 | McDonald et al. | 376/203 |
| 5,104,611 | 4/1992 | Woods et al. | 376/203 |

*Primary Examiner*—Daniel D. Wasil
*Attorney, Agent, or Firm*—James E. McGinness

[57] ABSTRACT

A self-aligning seal system for facilitating the repair or replacement of components of recirculation pump assemblies which penetrate the bottom head of the reactor pressure vessel of a boiling water reactor. The self-aligning seal system enables an operator to block off stub openings in the bottom portion of a water-filled reactor pressure vessel while performing maintenance in an underlying dry field without draining the coolant water from the reactor pressure vessel. To prevent leakage due to misalignment of the seal relative to the open end of the stub, the seal system is provided with a self-alignment guide member which centers the sealing unit relative to a diffuser opening coaxial with the stub as the sealing unit is lowered onto the stub.

16 Claims, 6 Drawing Sheets

SELF-ALIGNING SEAL SYSTEM FOR MAINTENANCE SERVICE IN NUCLEAR REACTOR PRESSURE VESSELS

RELATED PATENT APPLICATION

This application is a continuation-in-part application of U.S. patent application Ser. No. 07/786,460 filed on Nov. 1, 1991, which issued on Jun. 20, 1995 as U.S. Pat. No. 5,426,675.

FIELD OF THE INVENTION

This invention relates to equipment used in maintenance service of internal recirculation pumps in boiling water nuclear fission reactor plants. The invention specifically relates to seals used when repairing or replacing components associated with internal recirculation pumps of the type located inside the pressure vessel of an advanced boiling water reactor (ABWR).

BACKGROUND OF THE INVENTION

Some categories of water-cooled moderated nuclear fission reactor plants used for producing steam to generate electrical power, such as commercial ABWRs, utilize coolant water recirculation pumps having drive motors located in casings outside of the reactor pressure vessel (RPV). The drive motors are connected to pump impellers located within the RPV by means of drive shafts which pass through the wall of the RPV. Thus, in nuclear fission reactor plants of this type, a number of internal impeller pumps driven by external electrical or other motors are positioned in the lower or bottom portion of the RPV, each pump having a drive shaft extending through the wall of the RPV. This arrangement requires that a multiplicity of bore openings pass through the curved bottom portion of the RPV, which contains a large volume or head of recirculation coolant water under high temperature and high pressure for submerging the fuel core and transferring heat away from the fuel core and to equipment for converting steam into electricity.

Each bore opening in the RPV for passage of a pump drive shaft therethrough is formed by the bore of a short, hollow cylindrical stub which projects vertically upward from the vessel bottom. In one design, a hollow cylindrical housing supports the external drive motor casing and surrounds the drive shaft extending from the motor. The housing passes through the RPV wall with the drive shaft extending therefrom to the pump impeller for recirculation coolant water within the RPV. This hollow cylindrical housing extends concentrically within the bore of the stub and up into the RPV. The housing is secured, for example, by welding the upper annular end of the housing to the surrounding inside area of the main cylindrical stub bore.

Due to the routine mechanical movement of such driven impeller pumps, including high-speed rotation and inherent vibrations, which over a period of time can result in wear and metal stress and fatigue, components of this recirculation pump system are periodically serviced and may be replaced to ensure effective and safe operation of the nuclear reactor plant. Maintenance service of this kind may require replacement or repair welding of the hollow cylindrical housing which supports the drive motor casing and surrounds the pump drive shaft, and extends concentrically a distance into the stub bore.

Maintenance service of this recirculation system, including either replacement or repair welding of portions thereof, such as the upper annular end of the hollow cylindrical housing, the encircling portion of the hollow cylindrical stub or the stub-to-housing weldment therebetween, must be carried out under cumbersome and difficult circumstances. Namely, this maintenance procedure must be performed within the lower portion of the RPV while the vessel retains a substantial body of radioactively contaminated coolant water for covering and cooling the fissionable fuel core, which produces heat even during shutdown. Thus, the maintenance service, including repair welding of the upper annular end of the hollow cylindrical housing or stub or weldment therebetween, must be carried out beneath a high head of water which is radioactively contaminated. During the procedure, the coolant water cannot be permitted to escape through the pressure vessel bore opening that enables entry of the recirculation pump drive shaft up into the RPV and through which the recirculation pump assembly is installed. Service operations under such stringent circumstances require very complex procedures and special equipment and tools.

SUMMARY OF THE INVENTION

The present invention is a self-aligning seal system for preventing flow or leakage of radioactively contaminated water from the reactor pressure vessel of an ABWR when the recirculation pump must be removed to facilitate a repair or a maintenance operation, such as replacement or repair of the recirculation pump drive motor casing or housing and weldments thereof. This seal system applies a seal to the open end of the hollow cylindrical stub, thus sealing off the flow of water therethrough. To prevent leakage due to misalignment of the seal relative to the open end of the stub, the seal system is provided with self-alignment means which center the sealing means relative to the stub.

In accordance with the preferred embodiment of the invention, the self-aligning seal system comprises two parts which are mutually slidable along a common axis. One part of the self-aligning seal system is a sealing unit having a circular cylindrical side wall of outer diameter less than the diameter of a diffuser opening in the pump deck and having a flange with circular sealing means formed at the bottom end of the side wall. When the sealing unit is properly positioned from above, the sealing means bears against the upper end of the hollow cylindrical stub to seal off the bore opening of the pump penetration. The other part of the self-aligning seal system is a seal guide member which is slidably coupled to the sealing unit and which serves to guide the sealing unit to its centered position atop the hollow cylindrical stub by bearing against the perimeter of the diffuser opening as the self-aligning seal system is lowered into position.

More specifically, the seal guide member has a plurality of legs which are circumferentially distributed at equal angular intervals. These legs have radially inner surfaces which are parallel to the longitudinal axis of the sealing unit and which slide in a corresponding plurality of longitudinal grooves formed on the outer circumferential surface of the sealing unit side wall. The seal guide member legs have radially outer surfaces which are inclined at a predetermined acute angle relative to the corresponding radially inner surface. The radially outer surfaces of the plurality of legs intersect a hypothetical truncated cone having a minimum diameter at one end which is less than the diameter of the sealing unit side wall and less than the diameter of the diffuser opening, and having a maximum diameter at the other end which is greater than the diameter of the sealing unit side wall and greater than the diameter of the diffuser opening.

In accordance with the invention, as the self-aligning seal system is lowered through the diffuser opening, initially one or two of the legs contact the periphery of the diffuser opening. As the seal system is lowered further, the periphery of the diffuser opening bears against the radially outer surface of any abutting leg, producing a camming action which exerts a centering force on the seal guide member and the sealing unit coupled therewith. Eventually, the self-aligning seal system is lowered to a point where the radially outer surfaces of all legs abut the periphery of the diffuser opening, thus causing the seal guide member to seat snugly inside diffuser opening. The seal guide member remains seated in the opening as the sealing unit continues to be lowered until the sealing unit sits on the end of the stub. Because the diffuser opening is coaxial with the stub, the seating of the seal guide member in the diffuser opening ensures that the sealing unit will be centered relative to the stub when it is seated thereon.

DETAILED DESCRIPTION OF THE PREFERRED EMBODIMENTS

Figure 1:
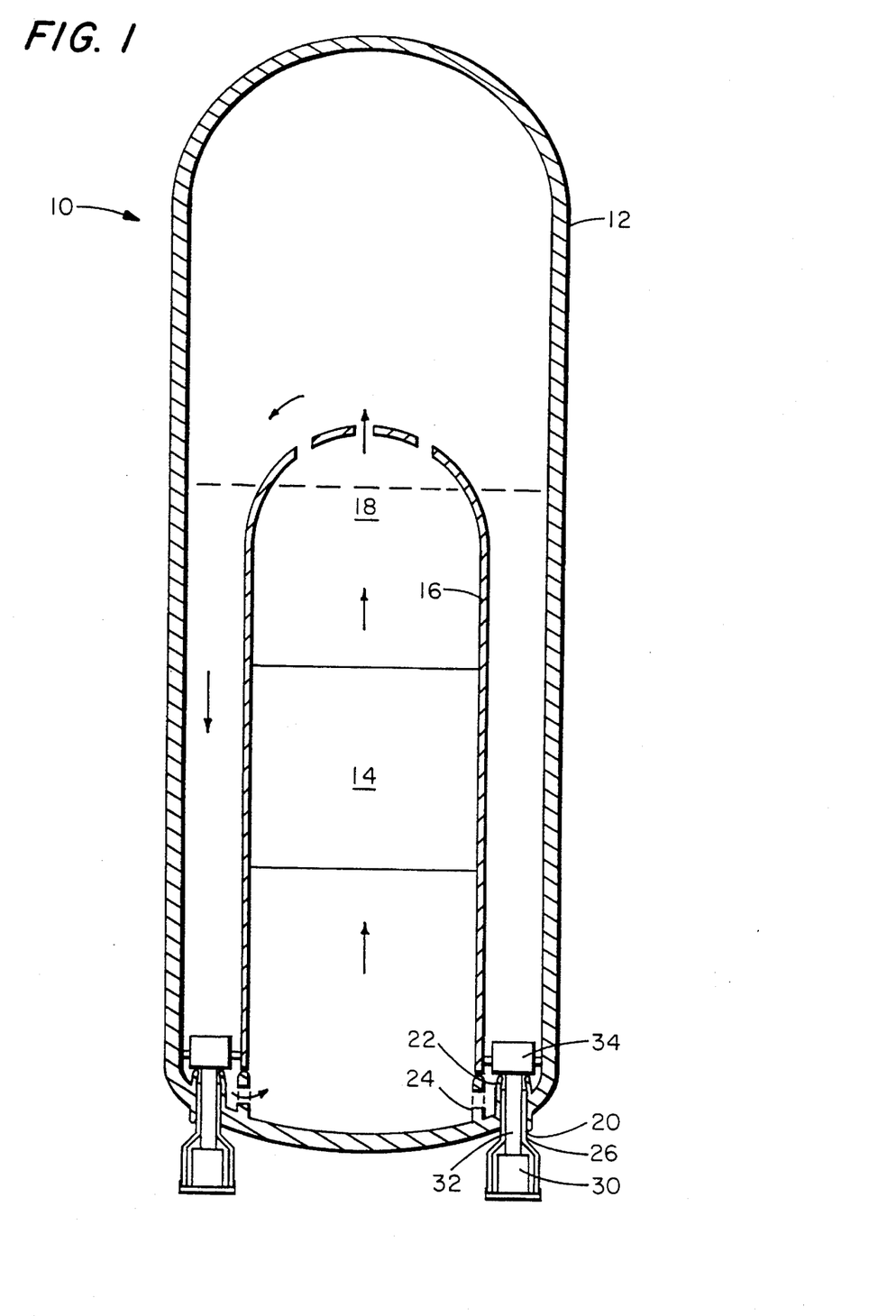
FIG. 1 is a partial sectional view of a reactor pressure vessel having recirculation pumps which penetrate the bottom head of the vessel.

Referring to FIG. 1, a nuclear fission reactor plant 10 comprises a reactor pressure vessel 12 enclosing a core 14 comprising a plurality of fuel rod assemblies (not shown) containing fissionable nuclear fuel. The fuel core 14 is surrounded by a fuel core shroud 16. Coolant water 18 covers the heat-producing fuel core 14 and fills a substantial portion of the RPV 12. The coolant water 18 is circulated through the reactor plant to carry away heat produced by the fission reaction within the fuel core. During the fission process, the water is transformed into a water-steam mixture. The steam is then separated from the water, the water being recirculated inside the RPV and the steam being piped outside the RPV to a steam-driven turbine (not shown) for generating electrical power.

The circulating coolant water 18 follows a repeating circuit. The coolant water flows downward through an annular space, that is, the downcomer annulus, between the circular cylindrical side wall of the RPV 12 and the circular cylindrical core shroud 16 arranged concentric with the RPV. At the bottom of the RPV, the water flows through openings in the shroud support 24. Then the coolant water flows upward through the heat-producing fuel core 14, where a portion of the coolant water is converted to steam that continues upward with liquid coolant water. After the steam has been separated and carried away, the coolant water which was not vaporized into steam exits the steam-water separators (not shown) and reverses direction, flowing downward in the downcomer annulus along with added feedwater.

Figure 2:
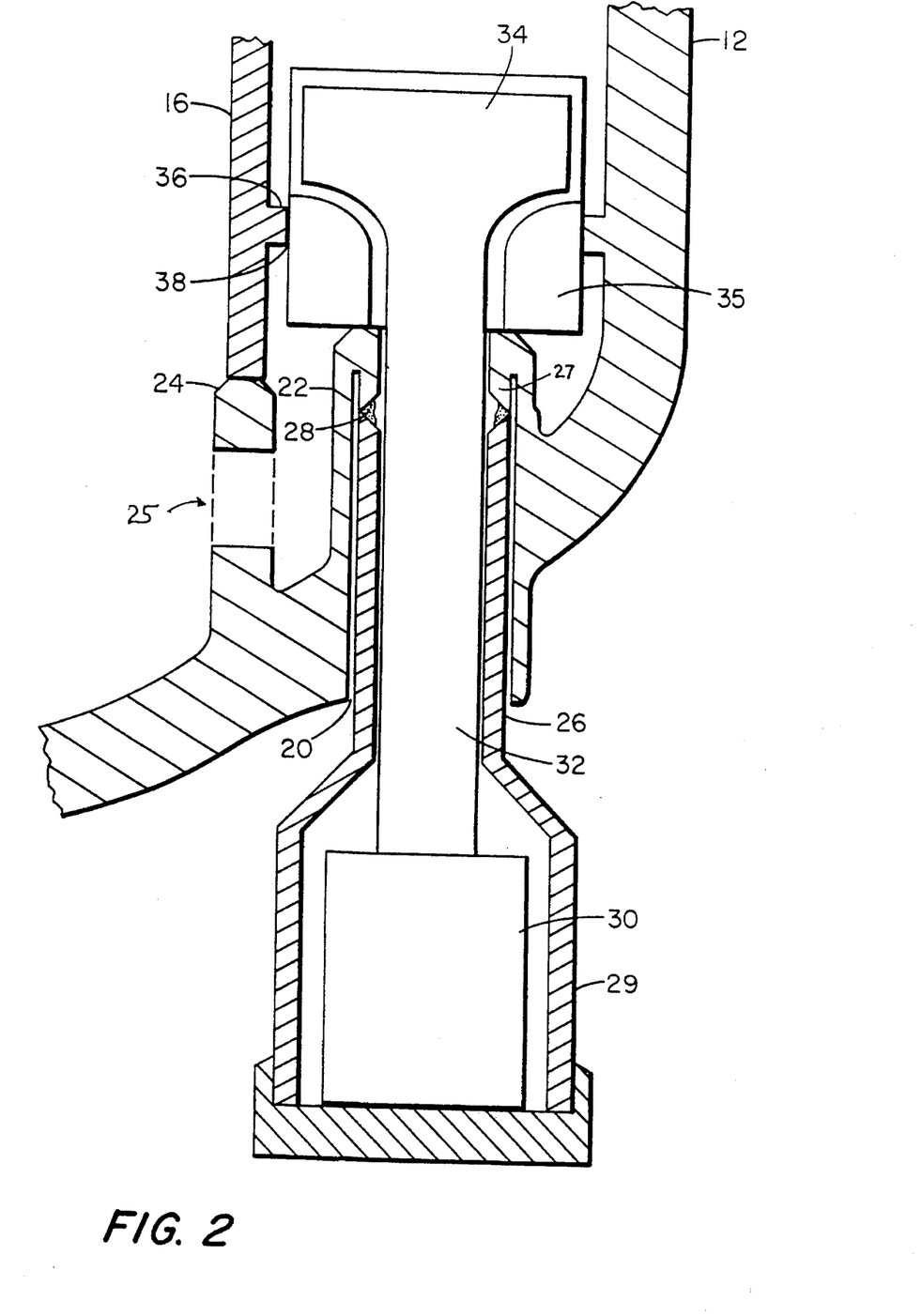
FIG. 2 is a partial sectional view of a portion of the bottom head of a reactor pressure vessel having a recirculation pump penetration.

ABWRs employ coolant water recirculation system comprising a multiplicity of impeller pumps (only two of which are shown in FIG. 1) positioned in a generally circular arrangement around the periphery of the bottom head of the RPV 12. As shown in FIGS. 1 and 2, each recirculation pump comprises an impeller 34 located inside the RPV and a drive motor 30 mounted external to the RPV, the drive motor 30 and impeller 34 being connected by a drive shaft 32 which penetrates the bottom head of the RPV. Typically, the pump penetration through the bottom head of the RPV is accomplished by forging a hollow circular cylindrical stub 22 into the bottom head shell ring. The stub extends generally vertically upward into an annular peripheral area between the side wall of the RPV and the core shroud support 24. The circular cylindrical bore of the stub forms the penetration, which is hereinafter referred as the bore opening 20.

In accordance with conventional practice, the drive shaft 32 of the recirculation pump is housed in a hollow circular cylindrical housing 26 which is concentrically arranged inside the bore of stub 22. The upper end of the drive shaft housing 26 is joined by a circumferential weld 28 to the lower end of a connection sleeve 27, which may be either welded to or integrally formed with the stub 22. The connection tube 27 is concentrically arranged inside the bore of stub 22 and has a diameter equal to the diameter of cylindrical housing 26.

A lower portion of cylindrical housing 26, which projects downward and away from the RPV 12, supports a drive motor casing 29, which provides an enclosure for the electrical drive motor 30. Enclosed within the drive shaft housing 26, drive shaft 32 extends from drive motor 30 through the bore opening 20 to the pump impeller 34, which is positioned within the diffuser 35 in an opening in a pump deck 36. Pump deck 36 is a circular plate welded on its outer periphery to the RPV and on its inner periphery to the core shroud 16. The motor-driven pump impellers, respectively positioned in the diffuser openings 38 through pump deck 36 and spaced around the lower portion of the RPV 12, draw coolant water downward through the downcomer annulus and force the coolant water through the openings 25 in the core shroud support 24 and then into the fuel core 14. This circulation of coolant water is continuously repeated, with the loss due to evaporation of a portion of the liquid coolant water being made up by recycled steam condensation returned from performing work, such as driving a turbine.

The substantially continuous operation of such recirculation pumps over prolonged periods of time within an environment of nuclear radiation, high temperatures, high pressures, and vibrations, creates a need for providing routine periodic maintenance inspections and/or service of the pump components. For example, it may be necessary to repair weld the annular end of drive shaft housing 26 and the surrounding portions of stub 22 or to replace or recondition the weld 28, which is subject to stress corrosion cracking and fatigue.

Since RPV 12 is substantially filled with coolant water 18 for submerging the heat-producing fuel core 14 and carrying away the produced heat by routine circulation of the coolant water even during shutdown, maintenance service or repairs for the recirculation pump components must be performed without removing or substantially reducing the water contents of RPV 12.

Figure 6A:
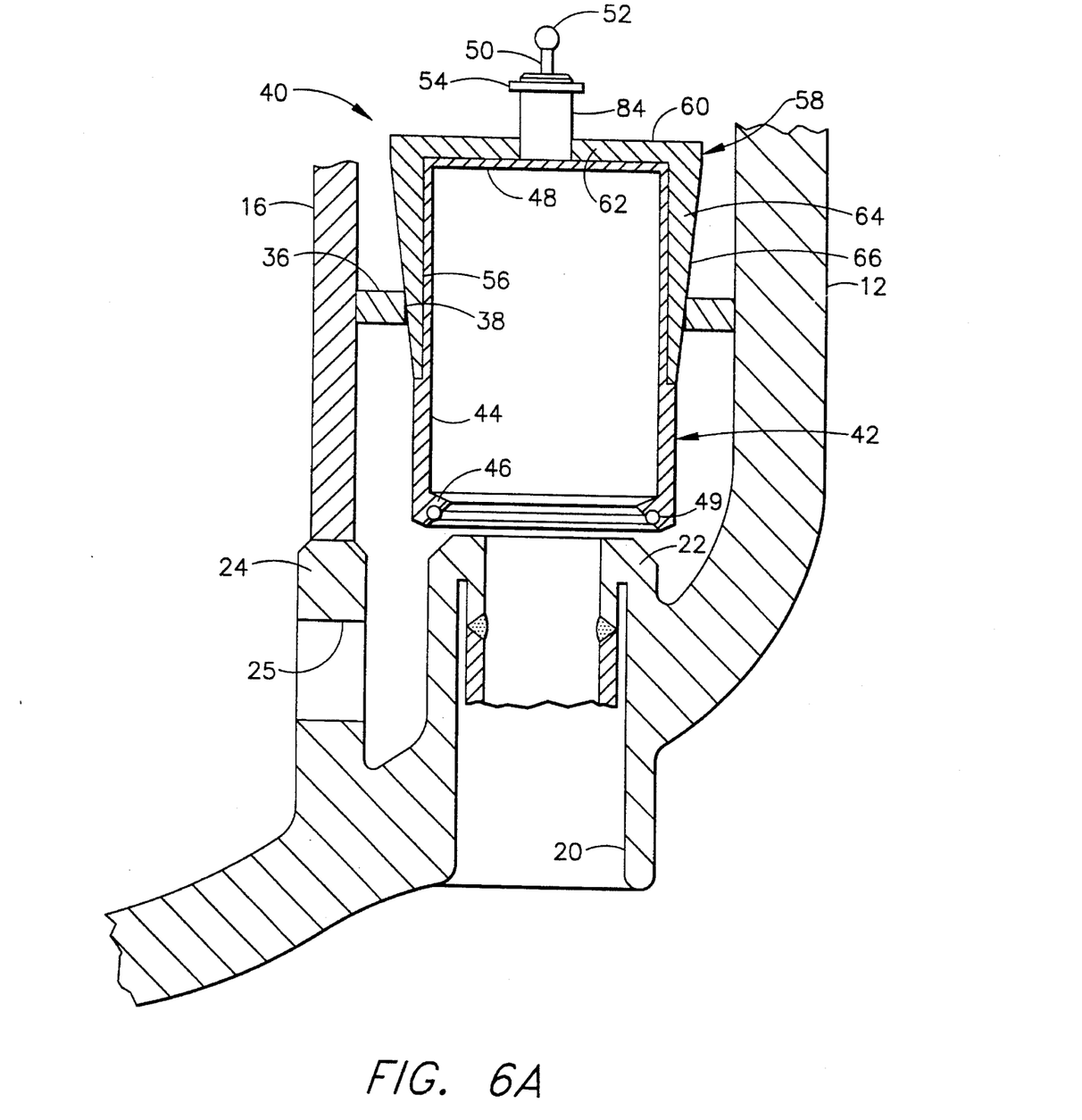
FIGS. 6A and 6B are sectional views of the self-aligning seal system in accordance with the preferred embodiment of the invention, showing the seal system in an aligned state just prior to lowering of the sealing unit onto the stub (FIG. 6A) and in the final sealing position on top of the stub after the sealing unit has been lowered relative to the seal guide member which is held in the diffuser opening in the pump deck.
Figure 6B:
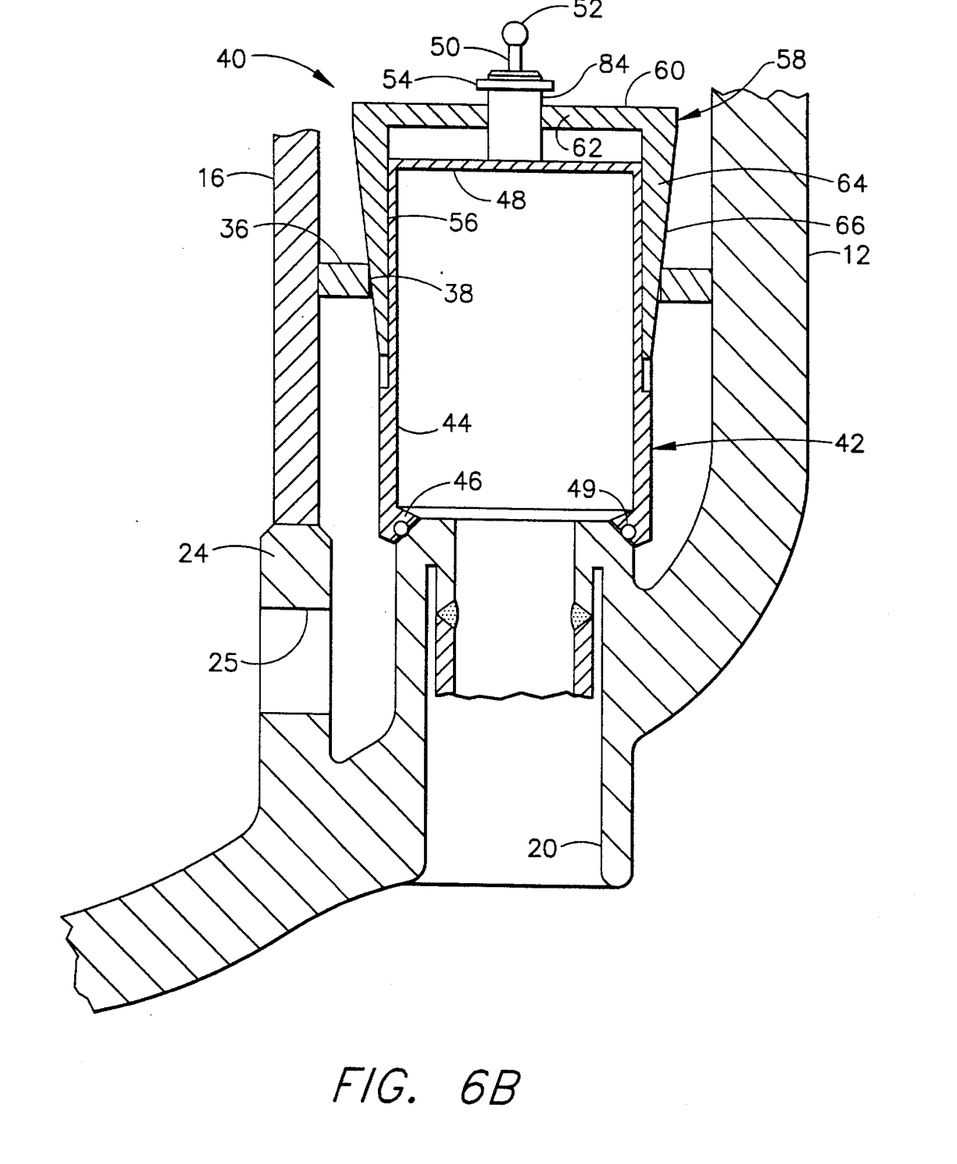

In accordance with the present invention, a unique self-aligning sealing system 40, shown assembled and installed in FIG. 6B, is provided. Following removal of the pump impeller 34, the drive shaft 32 and the diffuser 35 from overhead, the self-aligning sealing system 40 can be installed from overhead using conventional remotely operated underwater tools, such as a hoist and a grapple operated from the refueling bridge. The remotely operated tool extends down through the substantial depth of the pool of coolant water contained within the RPV 12.

Figure 3:
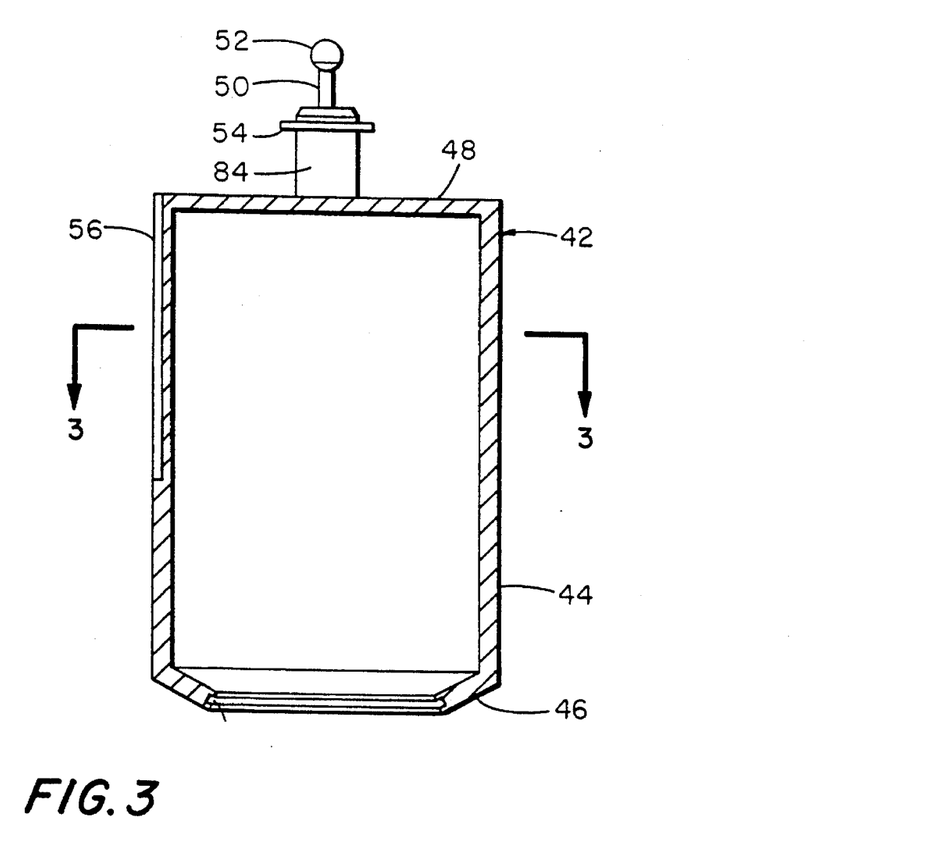
FIG. 3 is a partial sectional view of a cylindrical sealing unit which forms a part of the self-aligning seal system in accordance with the preferred embodiment of the invention.
Figure 4:
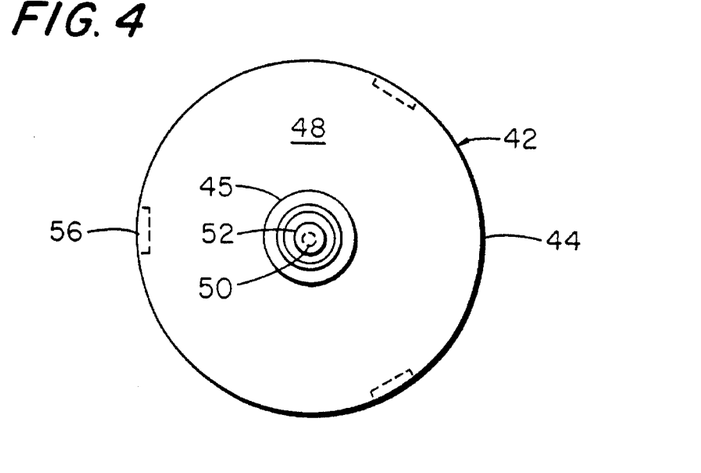
FIG. 4 is a top view of the cylindrical sealing unit shown in FIG. 3.
Figure 5:
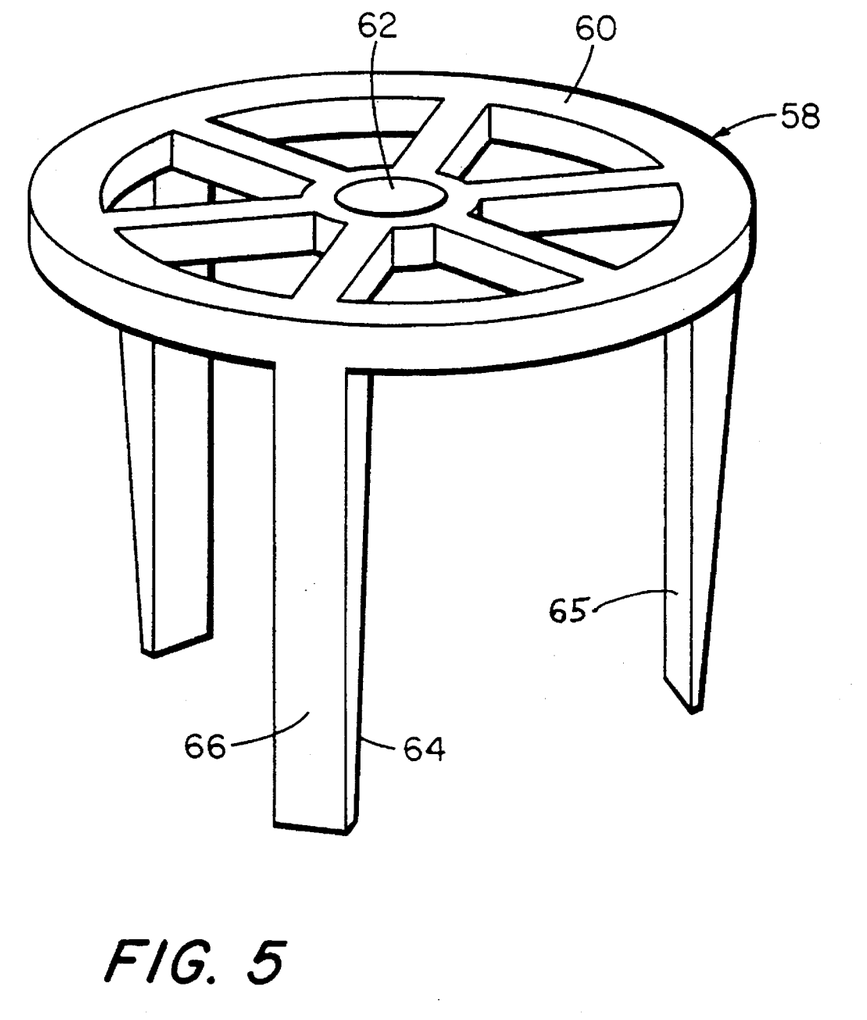
FIG. 5 is an isometric view of a seal guide member incorporated in the self-aligning seal system in accordance with the preferred embodiment of the invention.

In accordance with the preferred embodiment of the invention, the self-aligning seal system 40 comprises two parts: a sealing unit 42, shown in detail in FIGS. 3 and 4, and a seal guide member 58, shown in detail in FIG. 5. The sealing unit 42 and seal guide member 58 are coupled so that they are mutually slidable along a longitudinal axis relative to each other.

Referring to FIGS. 3 and 4, the sealing unit 42 comprises a circular cylindrical side wall 44 of outer diameter less than the diameter of the opening 38 in the pump deck 36. The side wall 44 has an open bottom end and a closed top end 48. The open bottom has a tapered inwardly projecting flange 46. The radially inner lip of flange 46 has an annular recess 47 for seating a circular sealing ring (not shown in FIG. 3). When the sealing unit 42 is properly positioned from above, the sealing ring 49 (see FIG. 6) bears against the upper end of the stub 22 to seal off the bore opening of the pump penetration.

The closed top 48 of cylindrical sealing unit 42 is provided with a cylindrical sliding support shaft 84 which extends perpendicular to the closed top 48 and coaxial with the longitudinal axis of side wall 44. A shaft 50 is connected to the distal end face of sliding support shaft 84 and extends generally perpendicular thereto. A knob 52 (or other suitable coupling mechanism) is in turn connected to the end of shaft 50 for gripping and handling underwater by means of a remote handling device such as a service, a hoist-mounted grapple or another device having an end grip for grasping and releasing the knob. Preferably a collar flange 54 is fixed to the distal end of sliding support shaft 84. The collar flange 54 acts as a stop member to prevent uncoupling of the seal guide member 58 from the sealing unit 42, as explained in more detail below.

Additionally the outer circumferential surface of the side wall 44 of sealing unit 42 has a plurality of generally equally spaced or symmetrically arranged, mutually parallel longitudinal grooves 56. These grooves serve as means for guiding the seal guide member to slide linearly along the longitudinal axis relative to the sealing unit. Each groove 56 extends upward to the top surface of closed top 48 and downward to a distance short of the bottom end of the sealing unit 42. The portions of side wall 44 which demarcate the bottom ends of grooves 56 serve as stop surfaces which block further downward displacement of the seal guide member relative to the sealing unit. In accordance with the preferred embodiment, three grooves 56 are distributed at equal angles about the circumference of side wall 44. However, the invention is not limited to the provision of three grooves. Any number of parallel grooves greater than three could also be distributed at equal angular intervals around the circumference of the side wall.

The other part of the self-aligning seal system is a seal guide member 58, shown in FIG. 5. Seal guide member 58 comprises a flat disk 60 in the shape of a spoked wheel, the outer diameter of the disk being slightly larger than the diameter of the closed end 48 of sealing unit 42 and the thickness of disk 60 being less than the length of sliding support shaft 84 of the sealing unit (see FIG. 3). Disk 60 is provided with a circular central opening 62 of diameter sufficient to receive the sliding support shaft 84 with an amount of play that allows the disk 60 to slide on sliding support shaft 84 along its length. The diameter of central opening 62 is less than the diameter of stop member 54, which is secured onto the distal end of sliding support shaft 84 after disk 60 is slid thereon. Thus, at the upper limit of sliding, the disk is stopped by the stop member 54 (see FIG. 3); at the lower limit of sliding, the disk is stopped by closed end 48. The seal guide member 58 is further provided with a plurality of legs 64 spaced at equal angles around the circumference of the disk and depending from the bottom surface of the disk in parallel with each other. The number of legs equals the number of grooves 56 formed on the outer circumferential surface of the side wall 44. The legs 64 are respectively positioned to mate with the grooves 56, thus slidably coupling the seal guide member 58 to the sealing unit 42. It will be apparent, however, that the legs and grooves need not be circumferentially distributed at equal angles provided that the angular spacing of the legs matches the angular spacing of the grooves.

More specifically, the legs 64 of seal guide member 58 have radially inner surfaces 65 which extend parallel to the longitudinal axis of the sealing unit. Each radially inner surface 65 has a constant cross section along its length which matches the cross section of the corresponding groove 56. Preferably the radially inner surfaces 65 are planar. When the seal guide member 58 is slid onto the sealing unit 42, each radially inner surface 65 is disposed parallel to the longitudinal axis of the sealing unit and slides in a corresponding longitudinal groove 56. In addition, the seal guide member legs 64 have radially outer surfaces 66 which are inclined at a predetermined acute angle relative to the corresponding radially inner surface 65. Each radially outer surface 65 is straight and preferably planar. The radially outer surfaces 66 of the plurality of legs 64 intersect a hypothetical truncated cone having a minimum diameter at one end which is less than the diameter of the sealing unit side wall 44 and less than the diameter of the opening 38 in the pump deck 36, and having a maximum diameter at the other end which is greater than both the diameter of side wall 44 and the diameter of opening 38. In other words, each radially outer surface extends at an acute angle relative to the centerline axis of the disk and has a midline lying in a respective radial plane and a radial distance from the centerline axis which increases linearly in a longitudinal direction from a first magnitude less than the outer radius of the sealing unit to a second magnitude greater than the outer radius.

The seal guide member 58 is designed to fit down over the cylindrical sealing unit 42 with the central opening 62 of disk 60 passing around the sliding support shaft 84 and knob 52 of sealing unit 42 and resting superimposed upon the closed top 48 of sealing unit 42. Additionally, legs 64 depending down from the disk 60 of guide member 58 mate within and slide down the longitudinal grooves 56 to form a composite self-aligning seal system 40. The collar flange stop 54 is installed on the sliding support shaft 84 above disk 60 of seal guide member 58 following assembly of seal guide member 58 over and embracing the cylindrical seal unit 42.

Thus assembled, the composite seal system 40 can be gripped by means of the knob handle 52 with a remote operating machine and manipulated from overhead by maintenance personnel stationed on the refueling bridge. With the pump impeller 34 and diffuser 35 removed, the seal system 40 can be lowered deep underwater to a position overlying a circular diffuser opening 38 in pump deck 36. As the self-aligning seal system 40 is lowered through the diffuser opening 38, initially one or two of the legs will contact the periphery of the opening. As the seal system 40 is lowered further, the periphery of the diffuser opening bears against the radially outer surface of any abutting leg of seal guide member 58, producing a camming action which centers the seal guide member and the sealing unit coupled therewith. Eventually, the self-aligning seal system is lowered to a point, shown in FIG. 6A, where the radially outer surfaces 66 of all legs 64 abut the periphery of the diffuser opening 38, thus causing the seal guide member 58 to seat snugly inside the diffuser opening. The seal guide member 58 remains seated in opening 38 as the sealing unit 42 is remotely lowered further until the sealing unit sits on the end of stub 22, as shown in FIG. 6B. Because the diffuser opening 38 is coaxial with the stub 22, the seating of the seal guide member 58 in the diffuser opening 38 ensures that the sealing unit 42 will be centered relative to the stub 22 when an attempt is made to seat the sealing unit thereon. If the seal system is properly aligned, the inward projecting flange 46 with the sealing ring 49 seated in a recess formed therein will adjoin the annular upper end of stub 22, thus sealing off the bore opening 20 against coolant water loss therethrough when components such as the drive motor 30 and drive shaft 32 are to be removed from below for needed maintenance in a dry field or environment.

The preferred embodiment of the invention has been disclosed for the purpose of illustration. Variations and modifications of the disclosed structure which do not depart from the concept of this invention will be readily apparent to engineers skilled in the art of mechanical engineering. All such variations and modifications are intended to be encompassed by the claims set forth hereinafter.

We claim:

1. A self-aligning seal system comprising:

a sealing assembly comprising a circular cylindrical side wall having first and second ends, a longitudinal axis and an outer circumferential surface of predetermined radius, means for closing said first end, and sealing means arranged at said second end;

seal guiding means comprising a plurality of centering surfaces, each centering surface being a straight surface extending at an acute angle relative to said longitudinal axis and having a midline lying in a respective radial plane and having a radial distance from said longitudinal axis which increases linearly in a first longitudinal direction from a first magnitude less than said predetermined radius to a second magnitude greater than said predetermined radius, wherein said first longitudinal direction is from said second end toward said first end of said sealing assembly; and means for coupling said seal guiding means to said sealing assembly such that said seal guiding means and said sealing assembly are mutually slidable relative to each other in parallel with said longitudinal axis.

2. The self-aligning seal system as defined in claim 1, wherein said coupling means comprises a plurality of longitudinal grooves formed on said outer circumferential surface of said sealing assembly and a corresponding plurality of longitudinal members forming parts of said seal guiding means, each one of said longitudinal members being slidable in a corresponding one of said longitudinal grooves.

3. The self-aligning seal system as defined in claim 2, wherein each of said longitudinal grooves has a sliding surface configuration which matches a sliding surface configuration of a corresponding one of said longitudinal members.

4. The self-aligning seal system as defined in claim 1, wherein the number of said longitudinal grooves is three.

5. The self-aligning seal system as defined in claim 2, wherein each of said centering surfaces is formed on a corresponding one of said longitudinal members.

6. The self-aligning seal system as defined in claim 2, wherein each of said longitudinal members has a radially inner surface and a radially outer surface, said radially inner surface serving as a sliding surface and said radially outer surface serving as one of said centering surfaces.

7. The self-aligning seal system as defined in claim 2, wherein each of said longitudinal members has a wedge shape with a base of said wedge being parallel to said longitudinal axis.

8. The self-aligning seal system as defined in claim 2, wherein said sealing assembly comprises a circular ring of sealing material seated in an annular recess.

9. The self-aligning seal system as defined in claim 1, further comprising means for blocking sliding of said seal guiding means relative to said sealing assembly at a predetermined distance from a planar surface of said seal guiding means.

10. A self-aligning seal system for sealing a stub underlying a circular diffuser opening of predetermined radius in a recirculation pump deck of a light water nuclear reactor, wherein said diffuser opening is coaxial with said stub, comprising:

a seal support structure having a circular cylindrical side wall with first and second ends, a longitudinal axis and an outer circumferential surface, said side wall being closed at said first end and having a tapered flange at said second end with a circular recess formed therein;

a sealing ring seated in said circular recess, said tapered flange being configured and dimensioned so that said sealing ring bears against an upper end of said stub when said seal support structure sits thereon; and a centering guide slidably coupled to said seal support structure and having a plurality of centering surfaces, each centering surface lying along a hypothetical truncated cone coaxial with said longitudinal axis at a respective azimuthal position and extending between a first end point at a minimum radial distance from said longitudinal axis and a second end point at a maximum radial distance from said longitudinal axis, said minimum radial distance being less than said predetermined radius of said diffuser opening and said maximum radial distance being greater than said predetermined radius of said diffuser opening.

11. The self-aligning seal system as defined in claim 10, wherein said seal support structure further comprises a plurality of longitudinal grooves formed on an outer surface of said sidewall and said centering guide further comprises a plurality of longitudinal portions respectively arranged to slide in said plurality of longitudinal grooves.

12. The self-aligning seal system as defined in claim 11, wherein the number of said longitudinal grooves is three.

13. The self-aligning seal system as defined in claim 10, wherein said centering guide comprises a disk-shaped base and a plurality of legs extending generally longitudinally from said base, wherein each of said legs has one of said centering surfaces and one of said longitudinal portions formed on opposing sides thereof.

14. The self-aligning seal system as defined in claim 13, wherein each of said legs has a wedge shape with a base of said wedge being parallel to said longitudinal axis.

15. The self-aligning seal system as defined in claim 10, further comprising means for blocking sliding of said centering guide relative to said sealing support structure at a predetermined distance from a top surface at said closed first end of said seal support structure.

16. The self-aligning seal system as defined in claim 10, further comprising means for coupling with a grapple for lowering said sealing system into said diffuser opening.

* * * * *